United States Patent [19]
Ito et al.

[11] Patent Number: 5,444,556
[45] Date of Patent: Aug. 22, 1995

[54] IMAGE FORMING APPARATUS FOR FORMING A PATTERN IMAGE CORRESPONDING TO A COLOR OF AN IMPUT IMAGE

[75] Inventors: Akio Ito, Machida; Hiroyuki Ichikawa, Kawasaki; Yoshinori Abe, Tama, all of Japan

[73] Assignee: Canon Kabushiki Kaisha, Tokyo, Japan

[21] Appl. No.: 328,345

[22] Filed: Oct. 21, 1994

Related U.S. Application Data

[63] Continuation of Ser. No. 25,748, Mar. 3, 1993, abandoned.

[30] Foreign Application Priority Data

Mar. 5, 1992 [JP] Japan ................. 4-083496

[51] Int. Cl.⁶ .......................... H04N 1/50; H04N 1/56
[52] U.S. Cl. ...................... 358/501; 358/522; 358/530
[58] Field of Search ............... 358/501, 515, 520, 522, 358/518, 530, 537, 539, 465, 466; 382/51

[56] References Cited

U.S. PATENT DOCUMENTS 4,979,129 12/1990 Okubo et al. .

FOREIGN PATENT DOCUMENTS

| | | |
|---|---|---|
| 0349780 | 1/1990 | European Pat. Off. . |
| 0422544 | 4/1991 | European Pat. Off. . |
| 0435658 | 7/1991 | European Pat. Off. . |
| 0446008 | 9/1991 | European Pat. Off. . |
| 0463844 | 1/1992 | European Pat. Off. . |

*Primary Examiner*—Scott A. Rogers
*Attorney, Agent, or Firm*—Fitzpatrick, Cella, Harper & Scinto

[57] ABSTRACT

An image forming apparatus includes an input unit, a color discriminating unit, a pattern generating unit, and an image forming unit. The input unit inputs an image having a plurality of colors. The discriminating unit discriminates the colors of the image input from the input unit. The pattern generating unit generates a pattern image in accordance with the discrimination result obtained by the discriminating unit. The image forming unit forms the pattern image, generated by the pattern generating unit, on a recording medium. The image forming unit forms the pattern image in different colors in accordance with the discrimination result obtained by the discriminating unit.

21 Claims, 14 Drawing Sheets

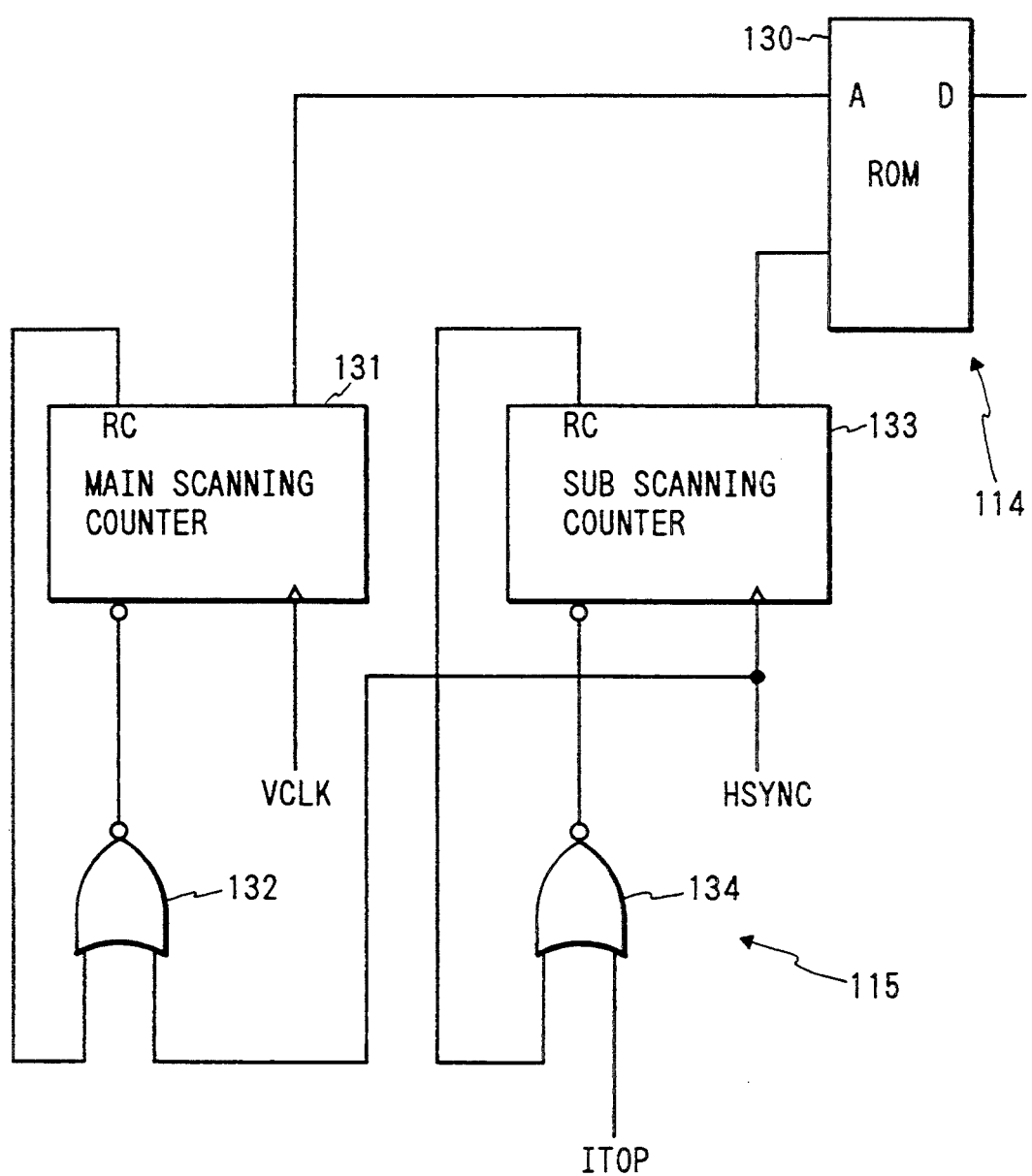

LOW ORDER ADDRESS

|   | 0 | 1 | 2 | 3 | 4 | 5 | 6 | 7 |
|---|---|---|---|---|---|---|---|---|
| 0 | 1 | 0 | 1 | 0 | 1 | 0 | 1 | 0 |
| 1 | 0 | 1 | 0 | 1 | 0 | 1 | 0 | 1 |
| 2 | 1 | 0 | 1 | 0 | 1 | 0 | 1 | 0 |
| 3 | 0 | 1 | 0 | 1 | 0 | 1 | 0 | 1 |
| 4 | 1 | 0 | 1 | 0 | 1 | 0 | 1 | 0 |

HIGH ORDER ADDRESS

IMAGE FORMING APPARATUS FOR FORMING A PATTERN IMAGE CORRESPONDING TO A COLOR OF AN IMPUT IMAGE

This application is a continuation of application Ser. No. 08/025,748 filed Mar. 3,1993, now abandoned.

BACKGROUND OF THE INVENTION

1. Field of the Invention

The present invention relates to an image forming apparatus for inputting an image having a plurality of colors, and forming the input image on a recording medium.

2. Related Background Art

The following image reproduction function has been proposed in a digital copying machine, an image scanner, a facsimile apparatus, and the like. First the color information of an original is converted into color signals by a photoelectric conversion element such as a color CCD or the like. Areas which are determined, on the basis of these color signals, to have the same color are replaced with a predetermined pattern such as a dot, horizontal line, or wavy line pattern. This pattern is then reproduced in a single color to reproduce a monochrome image, thereby realizing a visual effect similar to that obtained by reproducing a color image.

If a circular graph whose items are classified by colors is printed out in monochrome by using such a function, the respective items of the circular graph printed out in monochrome can be easily recognized by the user.

Generally, in a circular graph classified by colors, a conspicuous color such as red or orange is used for an item to be especially noticed. If, however, the above-described function of performing image reproduction by using a pattern having a single color is used, since even a conspicuous color is represented by a pattern with a single color, an item to be especially noticed cannot be made noticeable.

SUMMARY OF THE INVENTION

It is an object of the present invention to solve the above problem.

It is another object of the present invention to provide an image forming apparatus for converting a color image into a pattern image, which apparatus can make an image having a specific color noticeable.

It is still another object of the present invention to provide an image forming apparatus which can automatically discriminate an image area to be especially noticed.

The above and other objects, features, and advantages of the present invention will be apparent from the following detailed description in conjunction with the accompanying drawings and the appended claims.

BRIEF DESCRIPTION OF THE DRAWINGS

FIG. 16 is a block diagram of a pattern generating unit 114 and an address control unit 115;

DETAILED DESCRIPTION OF THE PREFERRED EMBODIMENT

Figure 1:
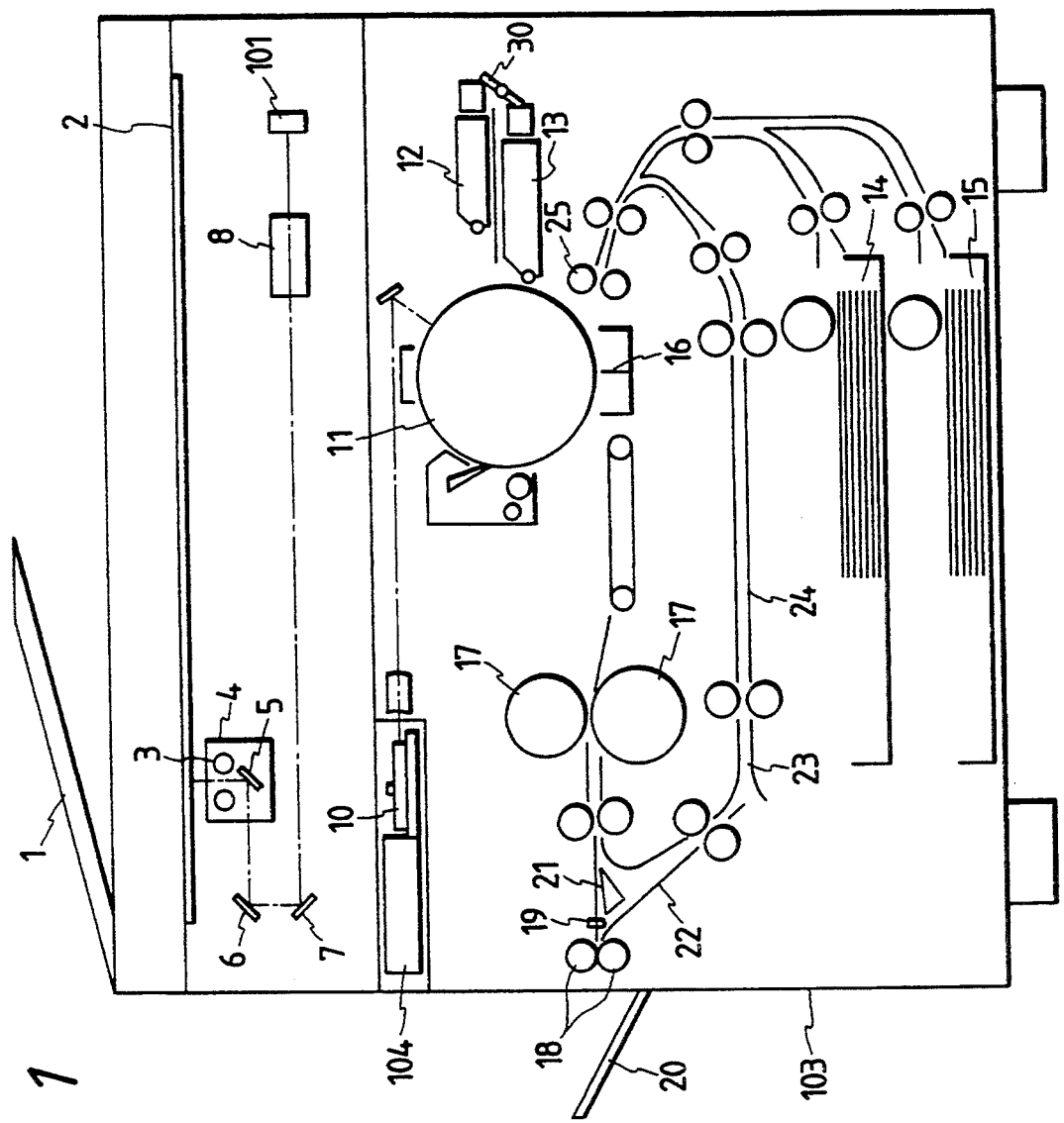
FIG. 1 is a sectional view of a copying machine according to an embodiment of the present invention.

An embodiment of the present invention will be described below with reference to the accompanying drawings.

The arrangement and operation of a copying machine according to the embodiment of the present invention will be described first with reference to FIG. 1. An original feeder unit 1 consecutively conveys a plurality of originals, one by one or in pairs, to a predetermined reading position on an original table 2, and discharges the originals after reading is completed. An original on the original table 2 is scanned by a scanner 4 having a lamp 3 and a mirror 5. The light reflected by the original is sequentially reflected by mirrors 6 and 7 and is focused on the light-receiving surface of a CCD sensor 101b by a lens 8, thus reading the original. The resultant signal is then processed by an image processing circuit.

This image data is converted into a laser beam by a laser scanner 10 on the basis of the image data which is output under the control of a CPU circuit unit 104, thus forming an electrostatic latent image on a photosensitive member 11. This electrostatic latent image is selectively visualized with a red toner or a black toner by a red developing unit 12 or a black developing unit 13. The red and black developing units 12 and 13 are controlled by a switching unit 30 such that one unit is moved close to the photosensitive member 11 while the other unit is moved away therefrom. The switching unit 30 is controlled by the CPU circuit unit 104.

Transfer sheets of standard sizes are stacked on transfer sheet stacking units 14 and 15 in advance. After one of these transfer sheets is conveyed to the nip portion of registration rollers 25 by convey roller pairs, conveying of the sheet is resumed by the registration roller 25 in synchronism with the leading end of the toner image on the photosensitive member 11. The toner image on the photosensitive member 11 is transferred onto the transfer sheet by a transfer charger and a separation charger 16. The toner image on the transfer sheet is fixed by a fixing unit 17.

In the single-side copy mode or the single-color developing mode, this transfer sheet is discharged onto a tray 20 by a discharge roller pair 18. In the two-color developing (multiple copy) mode, the leading end of the transfer sheet passes through convey paths 22 and 23 through a direction flap 21, and the sheet is stored on an intermediate tray 24. Thereafter, the sheet is guided to the transfer position again to be subjected to a multiple transfer operation. In the two-side copy mode, after the leading end of the transfer sheet passes through a paper discharge sensor 19, the sheet is guided to the transfer position again through the convey paths 22 and 23 and the intermediate tray 24 with the trailing end of the sheet going first, thus performing a transfer operation with respect to the lower surface of the sheet.

Figure 2:
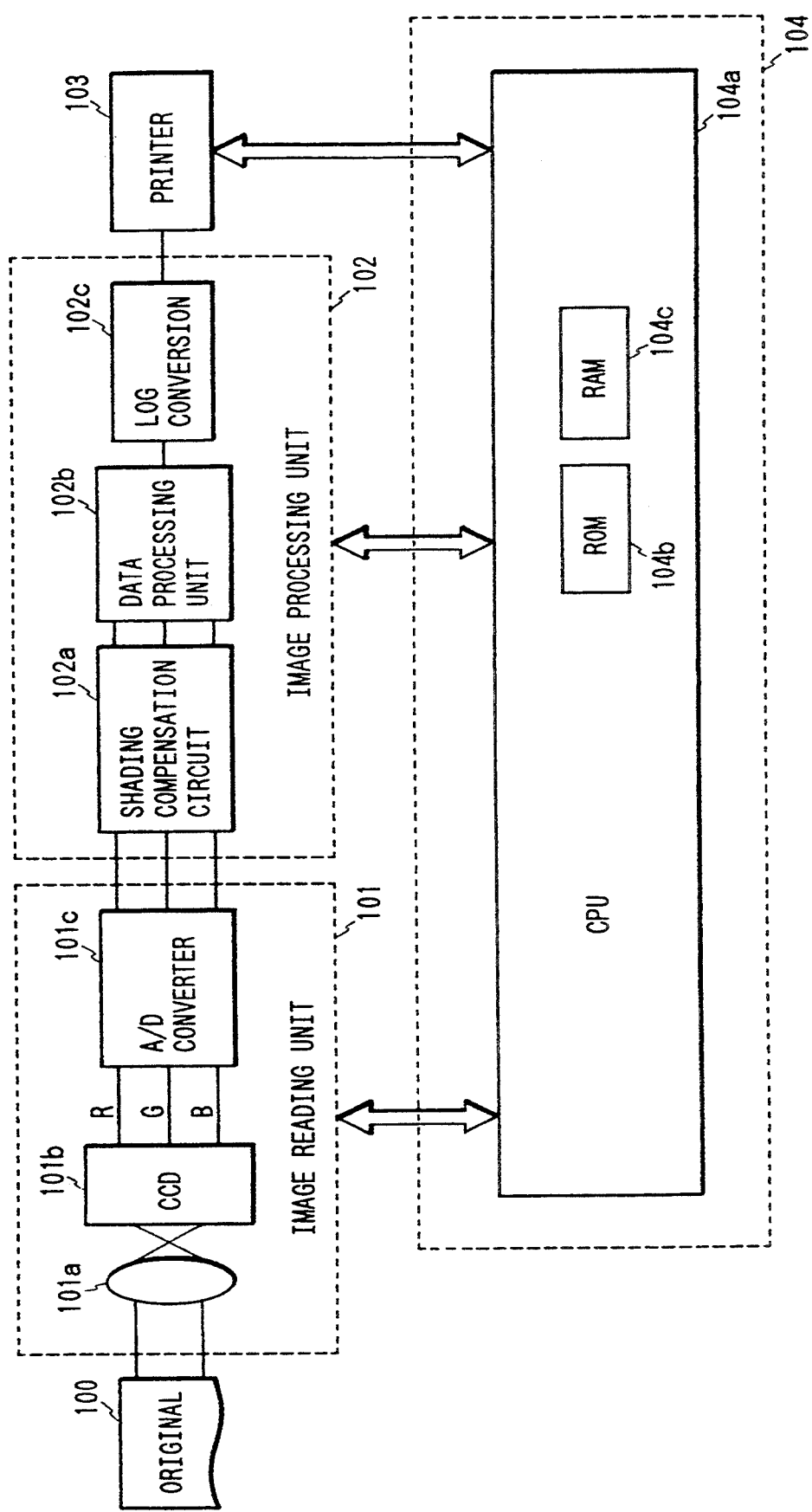
FIG. 2 is a block diagram showing the arrangement of the copying machine.

FIG. 2 is a block diagram showing the arrangement of a copying machine. A full-color original 100 is illuminated by the lamp 3. In an image reading unit 101, the full-color image is then formed on the light-receiving surface of the color CCD sensor 101b by a lens 101a, and the R (red), G (green), and B (blue) image data of each line of the image are read as analog signals, respectively, at a rate of 400 dpi, for example. The read signals are converted into digital signals by an A/D converter 101c. The digital signals are then sent from the image reading unit 101 to an image processing unit 102.

In the image processing unit 102, the R, G, and B digital signals are corrected by a shading compensation circuit 102a in accordance with the light amount irregularity of the lamp 3, the sensitivity error of the color CCD sensor 101b with respect to each pixel, and the like, thus obtaining 8-bit R, G, and B digital signals. Subsequently, in a data processing unit 102b, the colors of the image data are discriminated on the basis of these digital signals, and are converted into patterns corresponding to the respective colors. The respective patterns are converted into density data by a LOG convention unit 102c to be reproduced as a monochrome image by a printer 103.

The printer 103 includes a circuit for controlling, e.g., a motor for conveying a transfer sheet, a laser recording portion for writing image data from the image processing unit 102 on the photosensitive drum, and a developing control circuit for developing an image in monochrome. In addition, the CPU circuit unit 104 includes a CPU 104a, a ROM 104b, and a RAM 104c. The CPU circuit unit 104 controls the overall copying sequence of the digital copying machine by controlling the image reading unit 101, the image processing unit 102, the printer 103, and the like.

Figure 3:
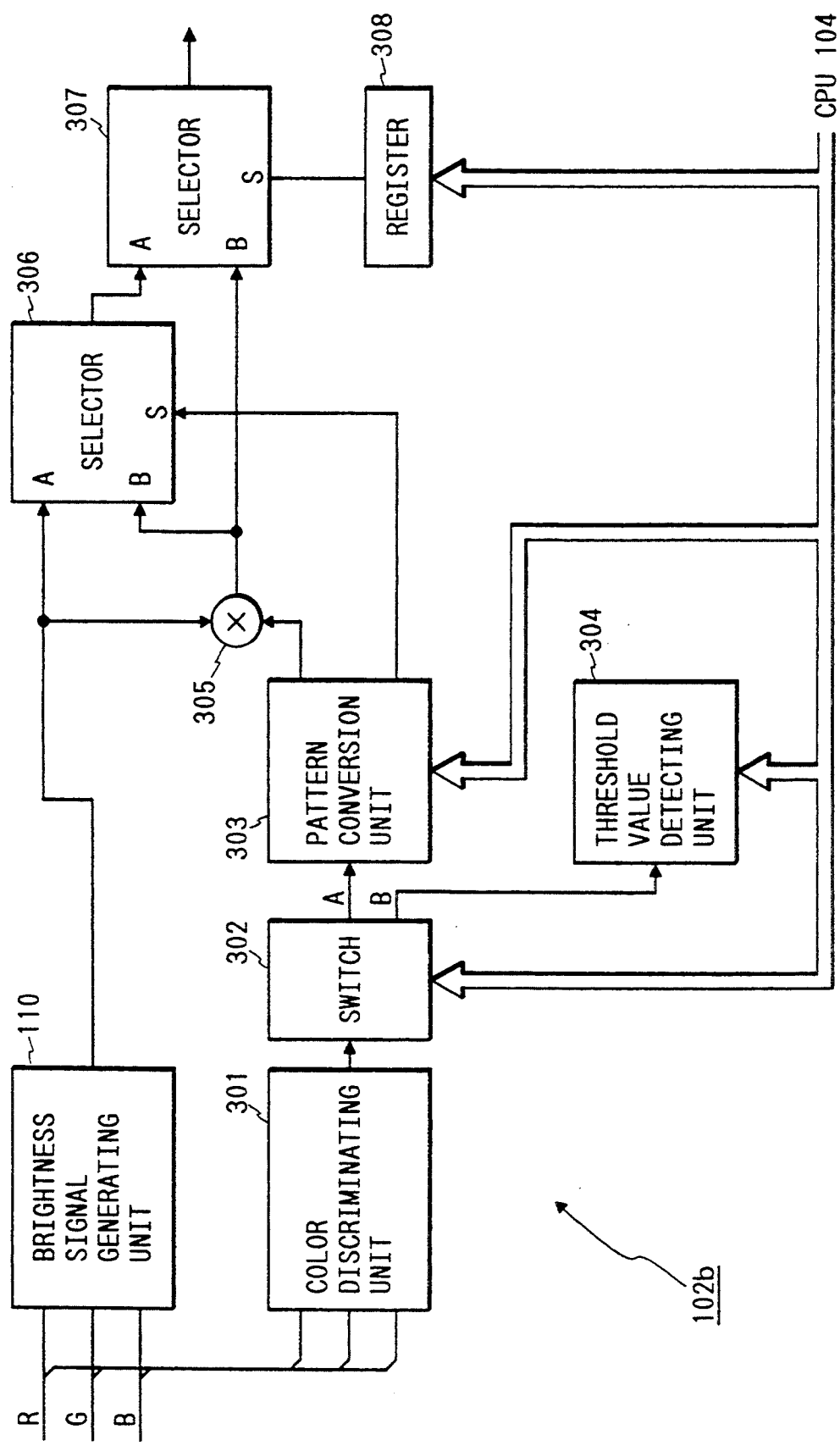
FIG. 3 is a block diagram of a data processing unit 102b.

FIG. 3 shows the arrangement of the data processing unit 102b. A brightness signal generating unit 110 generates non-color-separated image data throughout the entire wavelength region, i.e., monochrome brightness data Dout, from the color-separated R, G, and B signals. This data is then input to an input terminal A of a selector 306. Note that the brightness signal generating unit 110 generates the brightness data Dout by calculating the averages of the R, G, and B data using, e.g., an adder and a multiplier.

Figure 4:
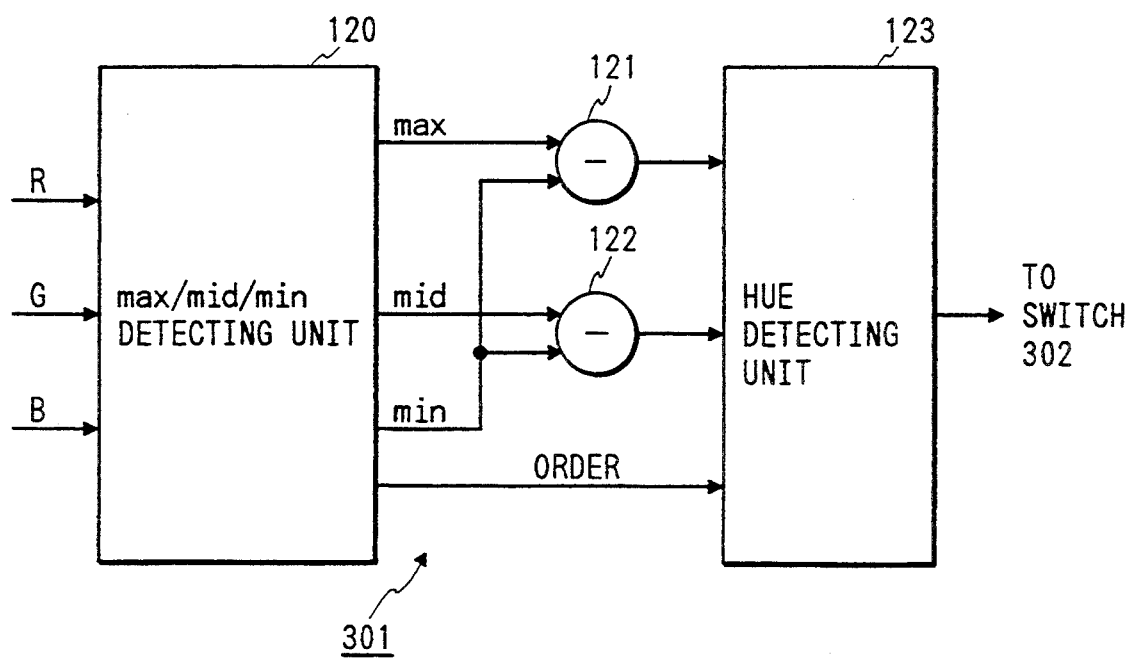
FIG. 4 is a block diagram of a color discriminating unit 301.

As will be described in detail in FIG. 4, a color discriminating unit 301 is constituted by only a max/mid/min detecting unit 120, subtracters 121 and 122, and a hue detecting unit 123.

The color discriminating unit 301 detects color components of the color original 100 by using a hue signal in order to reproduce the color image in monochrome patterns. In this case, the hue signal is used to accurately discriminate colors even if identical colors differ in vividness and brightness. Strictly speaking, the meaning of the word "hue" used in the following description is different from the general meaning of the word.

R, G, and B data input to the color discriminating unit 301 respectively consist of 8-bit data and are data having a total of $2^{24}$ colors. Since direct processing of such a large amount of data requires a large-scale, expensive circuit, the following processing is performed.

The max/mid/min detecting unit 120 compares the R, G, and B data through comparators to obtain values max (maximum values), values mid (middle values), and values min (minimum values), and outputs corresponding order signals. In addition, chromatic components are calculated by the subtracters 121 and 122.

Figure 5:
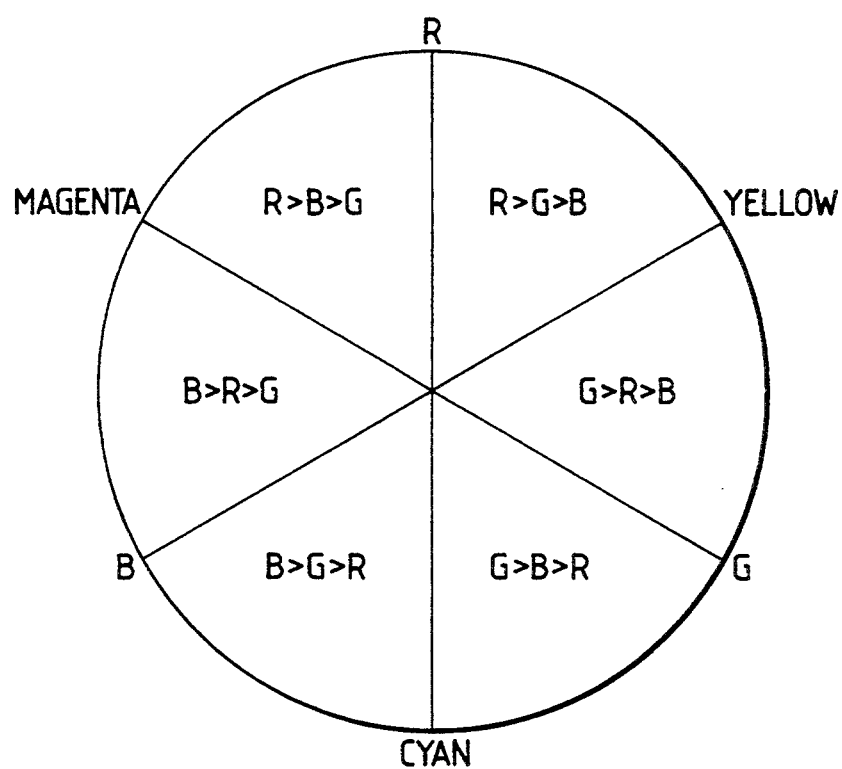
FIG. 5 is a hue value chart.

As is known in the Munsell system or the like, a color space is represented by saturation, lightness, and hue. First, R, G, and B data need to be converted into plane data, i.e., two-dimensional data. In this case, since the common portions of R, G, and B data, i.e., minimum values min (R, G, B) of the R, G, and B data, are achromatic components, the data min (R, G, B) are respectively subtracted from the respective color data. The remaining data are used as chromatic components. As shown in FIG. 5, the plane data obtained by such conversion is a 0°–360° plane which is divided into six sectors respectively representing color data based on the orders of the magnitudes of the R, G, and B data, i.e., R>G>B, R>B>G, G>B>R, G>R>B, B>G>R, and B>R>G. As a result, each 8-bit data is converted into a two-dimensional color space.

The hue detecting unit 123 is preferably constituted by a look-up table allowing random access, such as a RAM or a ROM, in which hue values corresponding to the angles of the plane shown in FIG. 5 are stored in advance. That is, the hue detecting unit 123 outputs hue values corresponding to values (max−min) from the subtracter 121, values (mid −min) from the subtracter 122, and order signals from the max/mid/min detecting unit 120. Therefore, with a simple arrangement, a three-dimensional color space can be converted into two-dimensional color space on the basis of the orders of the magnitudes of R, G, and B data, and the maximum and middle values of the R, G, and B data, and the corresponding hue values can be obtained.

As such hue values, values ranging from "0" to "239", with blue (B) serving as a start point in FIG. 5, are output to a switch 302. An achromatic component has a relatively small value (max−min). If, therefore, a value (max−min) is smaller than a certain value, a hue value other than "0" to "239" is output, thereby forming a histogram of only chromatic components, as will be described later.

Figure 6:
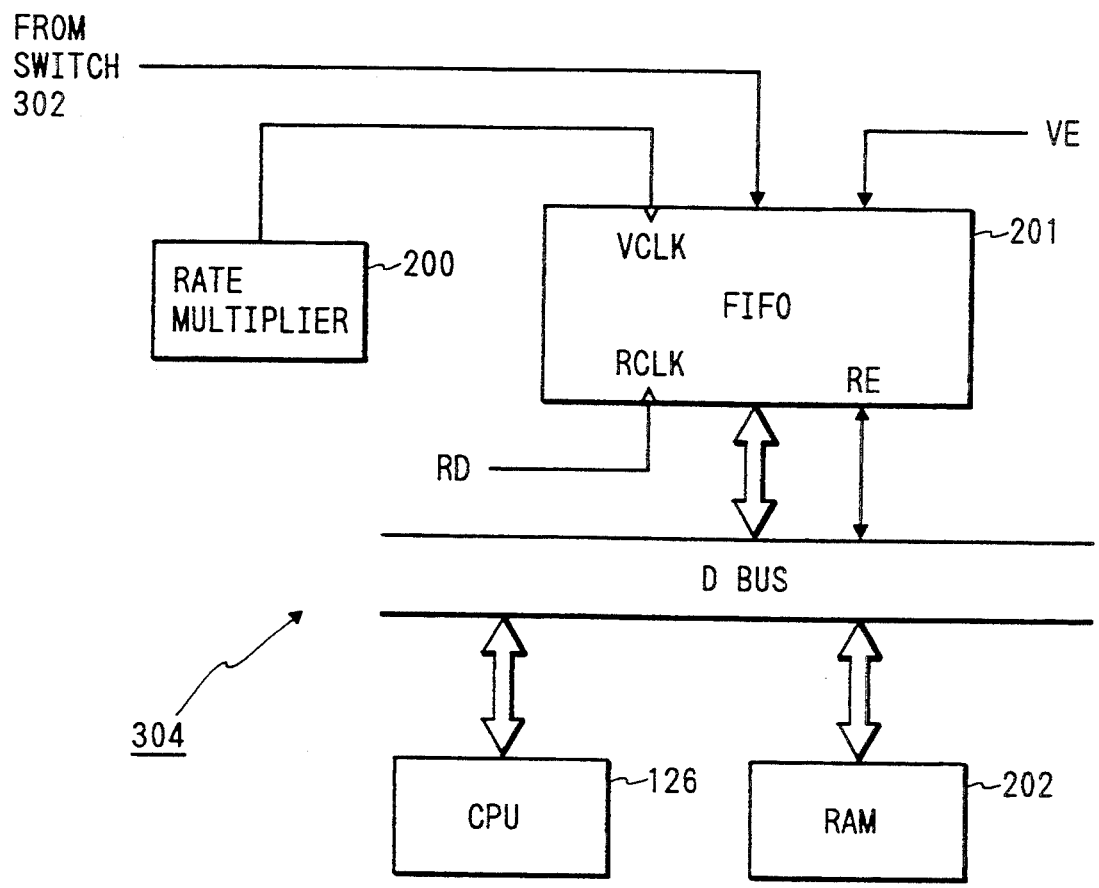
FIG. 6 is a block diagram of a threshold value detecting unit 304.

When the original 100 is to be pre-scanned, the switch 302 is switched to the B side under the control of a CPU 126 in order that an output from the hue detecting unit 123 might be stored in a FIFO memory 201 of a threshold value detecting unit 304 (FIG. 6) through the switch 302. The CPU 126 of the threshold value detecting unit 304 forms a histogram of hue values in advance on the basis of the image data of the original read by the pre-scan operation, and detects the boundaries between the colors on the original, i.e., the threshold values of the hue values.

A rate multiplier 200 is designed to output a signal once per 16 pixels in the main scanning direction of the original 100 and output a signal once per 16 lines in the sub scanning direction. Therefore, one hue value from the hue detecting unit 123 is loaded in the FIFO memory 201 per 16×16 pixels. The hue values loaded in the FIFO memory 201 in this manner are sequentially read out by the CPU 126 on the basis of a program pre-stored in the ROM 104b shown in FIG. 2. The read values ranging from "0" to "239" are respectively accumulated to from a histogram. The histogram is then loaded in a RAM 202.

Figure 7:
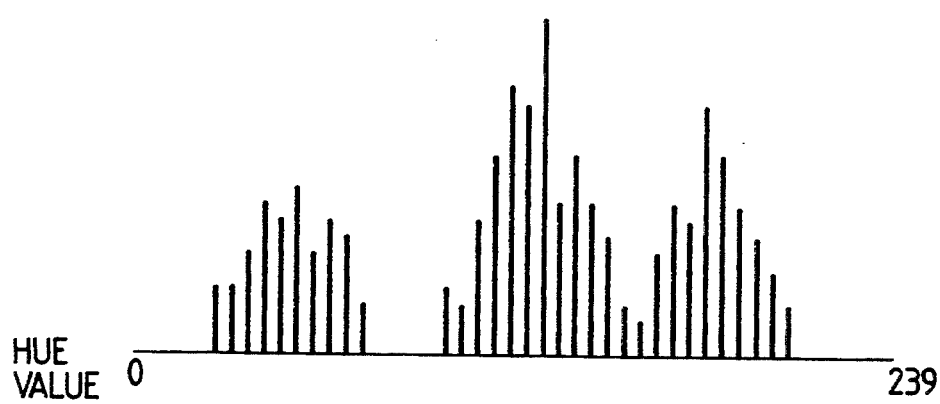
FIG. 7 is a histogram of hue values included in an original.

If the accumulation data are represented by a[0] to a[239], since the hue values of this histogram are discretely distributed, as shown in FIG. 7, it is difficult to determine threshold values from the histogram. For this reason, in the embodiment, smoothing processing is performed with respect to such data according to the following equation:

$$a[i]=(a[i-2]+a[i-1]+a[i]+a[i+1]+a[i+2])/5$$

where $0 \leq i > 240$.

Figure 8:
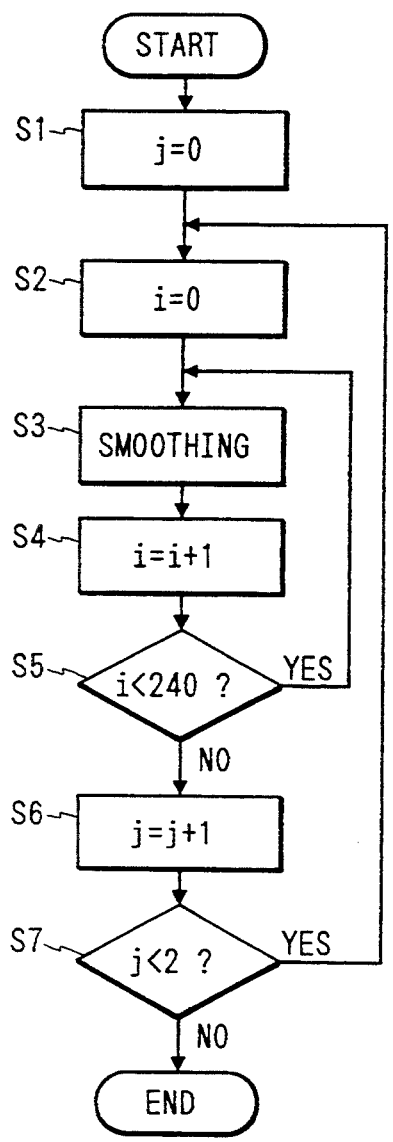
FIG. 8 is a flow chart showing a procedure for smoothing processing.

Since the changes in hue value are still coarse after one smoothing operation, smoothing is performed twice in the embodiment to form a histogram representing smooth changes in hue value, as shown in FIG. 8. More specifically, in step S1 shown in FIG. 8, a smoothing operation counter j is reset. In step S2, a hue value counter i is reset. In step S3, smoothing is performed according to the above equation. In the loop of steps S3 to S5, the first smoothing operation is performed with respect to values i ranging from "0" to "239". Assume that in the above equation, $a[-2]=a[238]$, $a[-1]=a[239]$, $a[240]=a[0]$, and $a[241]=a[1]$.

Figure 9:
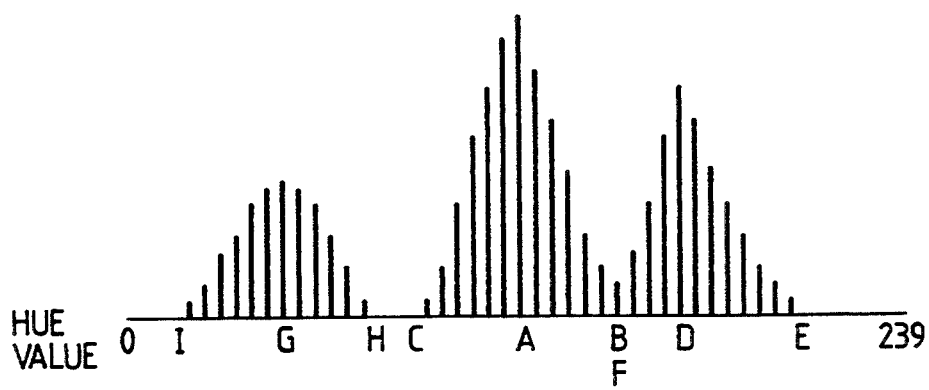
FIG. 9 is a histogram obtained after smoothing processing.

In step S6, the smoothing operation counter i is incremented. In the loop of steps S2 to S7, the second smoothing operation is performed. Hue values at points A to I are obtained from this smoothed histogram, as shown in FIG. 9.

Figure 10:
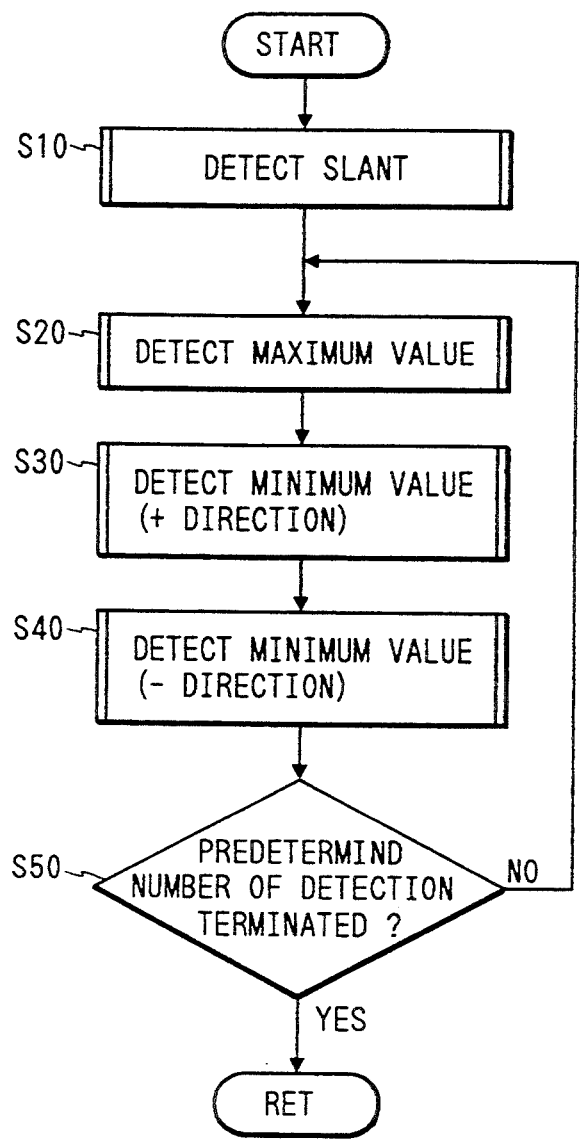
FIG. 10 is a flow chart showing a procedure for determining threshold values.
Figure 11:
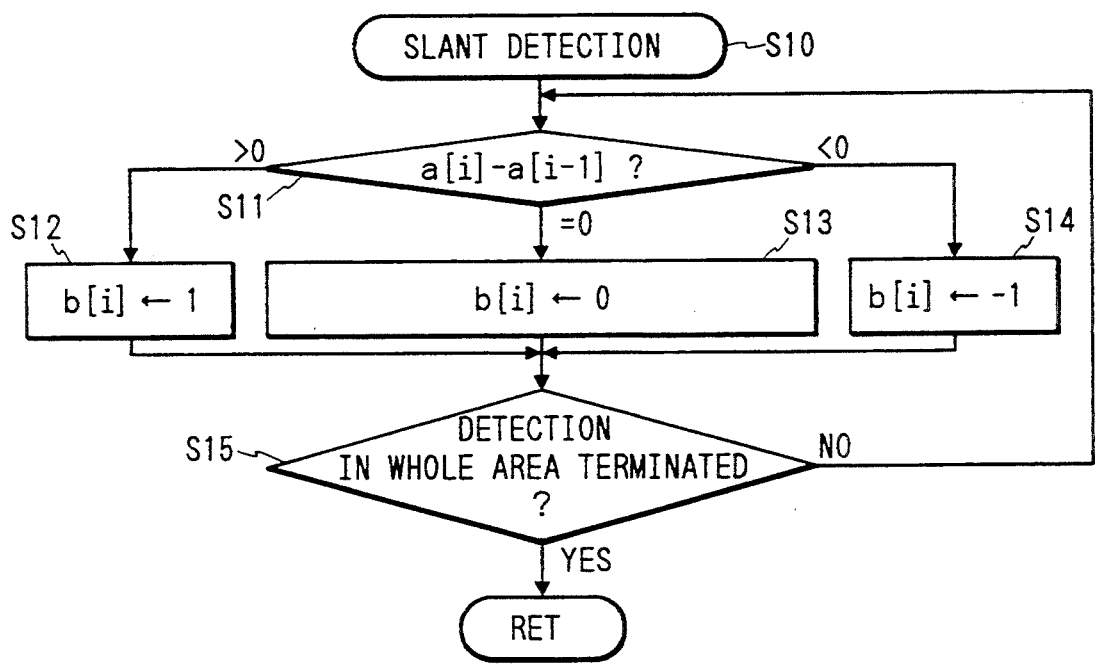
FIG. 11 is a flow chart showing a procedure for slant detection.
Figure 12:
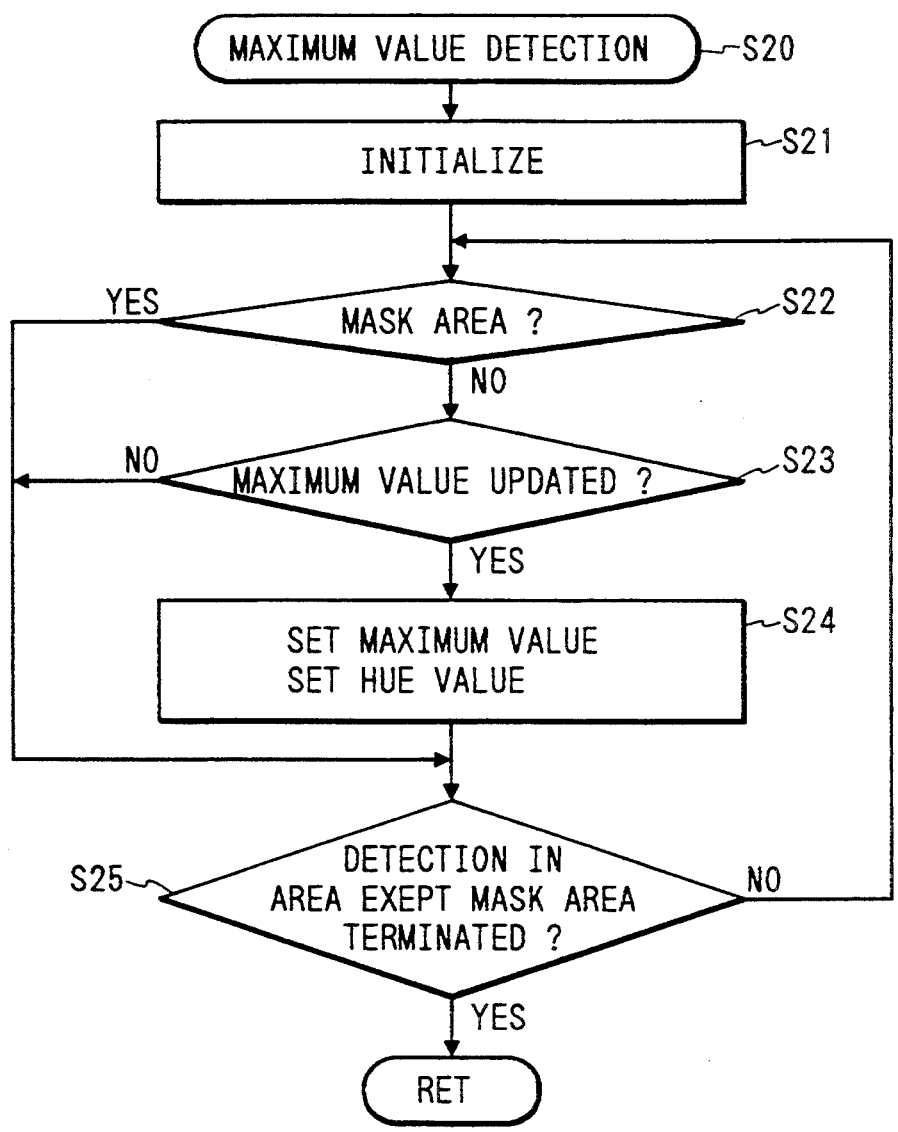
FIG. 12 is a flow chart showing a procedure for detecting maximum values.
Figure 13:
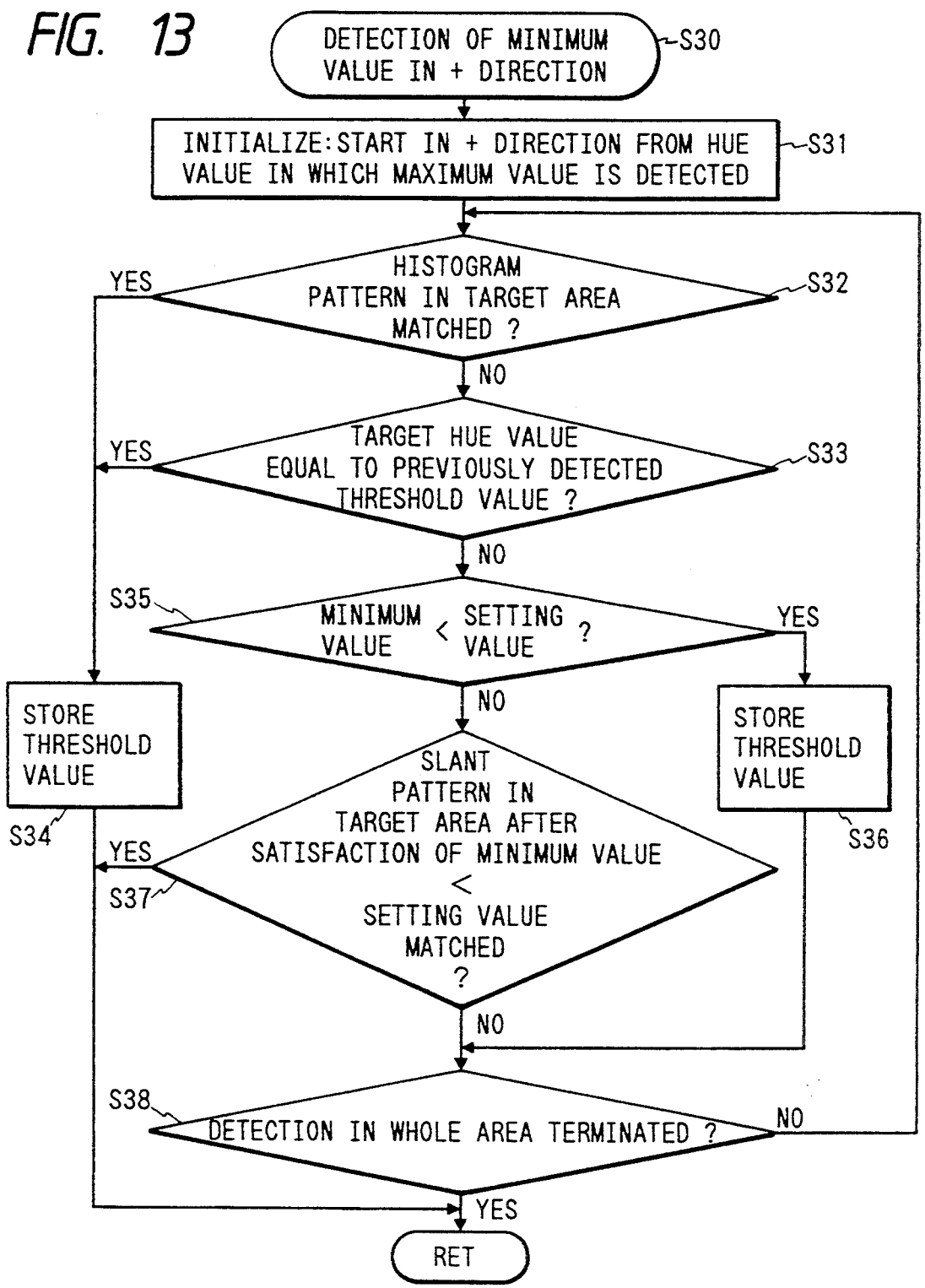
FIG. 13 is a flow chart showing a procedure for detecting a minimum value in the + direction.
Figure 14:
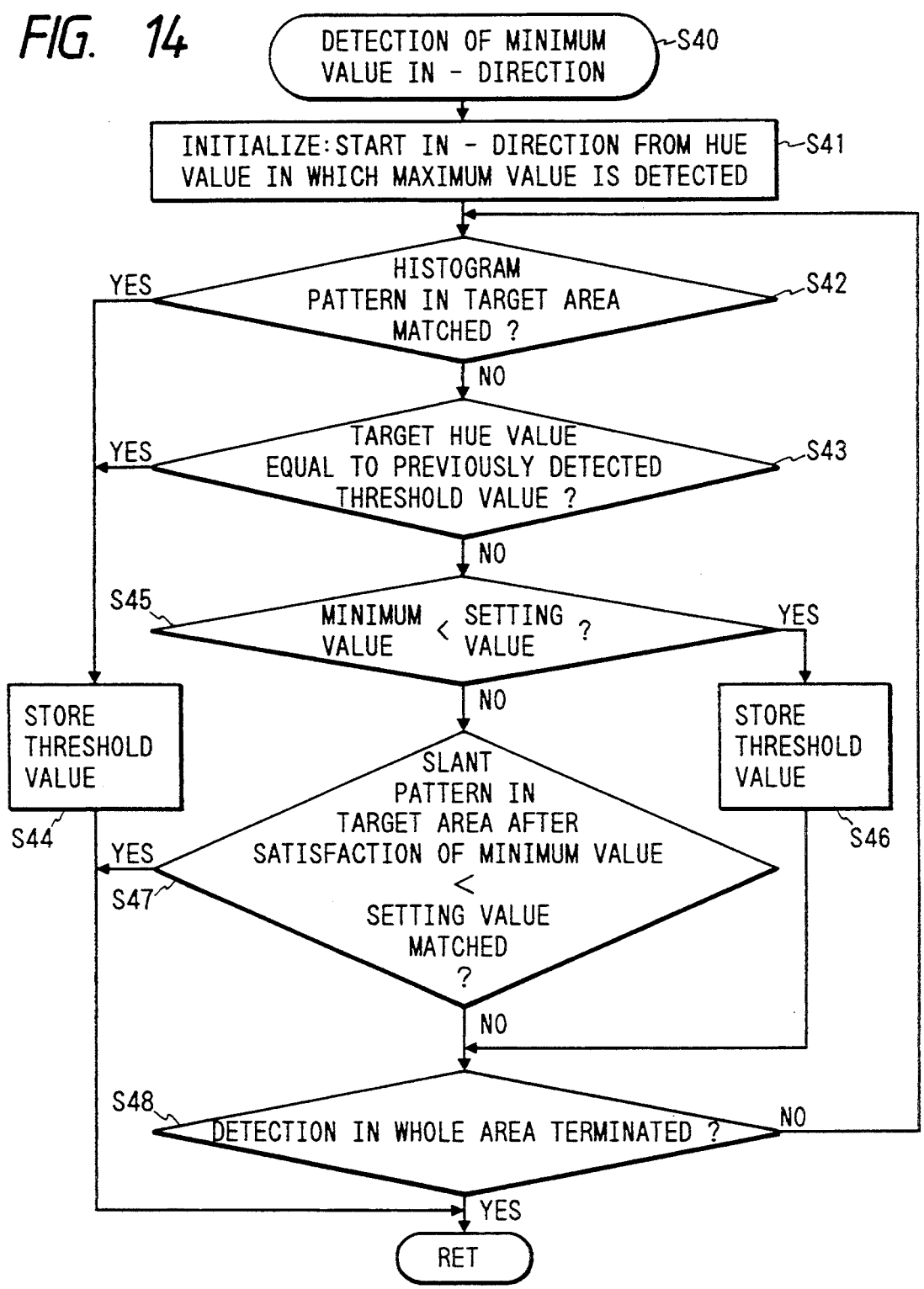
FIG. 14 is a flow chart showing a procedure for detecting a minimum value in the − direction.

FIG. 10 is a flow chart showing an outline of a procedure for determining threshold values. FIG. 11 is a flow chart showing a detailed procedure for slant detection in FIG. 10. FIG. 12 is a flow chart showing a detailed procedure for maximum value detection in FIG. 10. FIG. 13 is a flow chart showing a detailed procedure for minimum value detection in the + direction in FIG. 10. FIG. 14 is a flow chart showing a detailed procedure for minimum value detection in the − direction in FIG. 10. In step S10 shown in FIG. 10, the slant of each hue value is obtained. In step S20, the maximum value of the hue values is obtained. In step S30, the minimum value of the hue values in the + direction is obtained. In step S40, the minimum value of the hue values in the − direction is obtained. If it is determined in step S50 that detection has not been performed a predetermined number of times, the flow advances to step S20. If detection has been performed the predetermined number of times, the processing is ended.

According the procedure for slant detection shown in FIG. 11, a slant b[i] of a hue value i (=[0] to [239]) of a histogram is obtained as follows:

If $a[i]-a[i-1]>0$, then $b[i]=1$     (S11, S12)

If $a[i]-a[i-1]=0$, then $b[i]=0$     (S11, S13)

If $a[i]-a[i-1]<0$, then $b[i]=-1$     (S11, S14)

where $0 \leq i < 240$.

When the slants b[i] in the whole area of the histogram are obtained, the flow advances from step S15 to step S20 in FIG. 12. In the procedure for maximum value detection shown in FIG. 12, the respective parameters are initialized in step S21. With the first detection, a maximum value a[A] of a[0] to a[239] is obtained (steps S22 to S25). In this case, therefore, the maximum value a[A] is the hue value at a position A in FIG. 9. A procedure for the second and subsequent maximum value detections will be described later.

In the procedure for minimum value detection in the + direction shown in FIG. 13, the respective parameters are initialized in step S31. Subsequently, the hue value is changed in the + direction from the hue value at the position A, at which the maximum value a[A] is detected in step S20 in FIG. 12, as a start point, and the hue value which satisfies one of the following three conditions first is obtained and detected as a threshold value.

The first condition is that matching of histogram patterns in target areas (i−2), (i−1), (i), (i+1), and (i+2) of hue values is performed as follows (step S32):

$$a[i-2] \neq 0,\ a[i-1] \neq 0,\ a[i]=0,\ a[i+1]=0,\ a[i+2]=0$$

The hue value i which satisfies this condition is stored as a temporary threshold value (step S34).

The second condition is that when a target hue value is equal to the previously detected threshold value, the corresponding hue value i is stored as a temporary threshold value (steps S33 and S34). The third condition is that when an accumulation value a[i] is smaller than a setting value α (step S35), the corresponding hue value i is stored as a temporary threshold value (step S36). After the above-described condition is satisfied, matching of slant patterns in the target areas (i−2), (i−1), (i), (i+1), and (i+2) of the hue values is performed as follows (step S37):

$$b[i-2] \neq -1,\ b[i-1] \neq -1,\ b[i] \neq -1,\ b[i+1] \neq -1,\\ b[i+2] \neq -1$$

When this slant pattern matching condition is satisfied, the hue value stored in step S34 or S36 is obtained as a threshold value. In this case, the hue value at a position B is set as a threshold value.

In the procedure for minimum value detection in the − direction shown in FIG. 14, the respective parameters are initialized in step S41. Subsequently, the hue value is changed in the − direction from the hue value at the position A, at which the maximum value a[A] is detected in step S20 in FIG. 12, as a start point, and the hue value which satisfies one of the following three conditions first is obtained and detected as a threshold value.

The first condition is that matching of histogram patterns in target areas (i−2), (i−1), (i), (i+1), and (i+2) of hue values is performed as follows (step S42):

$$a[i-2]=0,\ a[i-1]=0,\ a[i]=0,\ a[i+1] \neq 0,\ a[i+2] \neq 0$$

The hue value i which satisfies this condition is stored as a temporary threshold value (step S44).

The second condition is the same as that in the procedure for minimum value detection in the + direction. Therefore, when a target hue value is equal to the previously detected threshold value, the corresponding hue value i is stored as a temporary threshold value (steps S43 and S34). The third condition is that when the accumulation value a[i] is smaller than the setting value α (step S45), the corresponding hue value i is stored as a temporary threshold value (step S46). After the above-described condition is satisfied, matching of slant patterns in the target areas (i−2), (i−1), (i), (i+1), and (i +2) of the hue values is performed as follows (step S47):

$$b[i-2]\neq 1, b[i-1]\neq 1, b[i]\neq 1, b[i+1]\neq 1, b[i+2]\neq 1$$

When this slant pattern matching condition is satisfied, the hue value stored in step S44 or S46 is obtained as a threshold value. In this case, the hue value at a position C is set as a threshold value.

In the second procedure for maximum value detection shown in FIG. 12, the respective parameters are initialized in step S20. Thereafter, in step S21, the area between the threshold values obtained in the above-described manner is masked. More specifically, as shown in FIG. 9, the area between the positions B and C is masked, and a maximum value a[D] of a[0] to a[C−1] and a[B+1] to a[239] is obtained (step S22 to S24). Similarly, in steps S30 and S40, the hue values at positions E and F, at which the hue value is minimized in the + direction and the − direction, with a position D of the obtained maximum value a[D] being regarded as the center, are obtained as threshold values. In addition, in the third procedure for maximum value detection, the maximum value at a position G and the hue values at minimum value positions H and I corresponding to the position G are obtained as threshold values. This threshold value determination processing is performed a predetermined number of times (five times in the embodiment).

Figure 15:
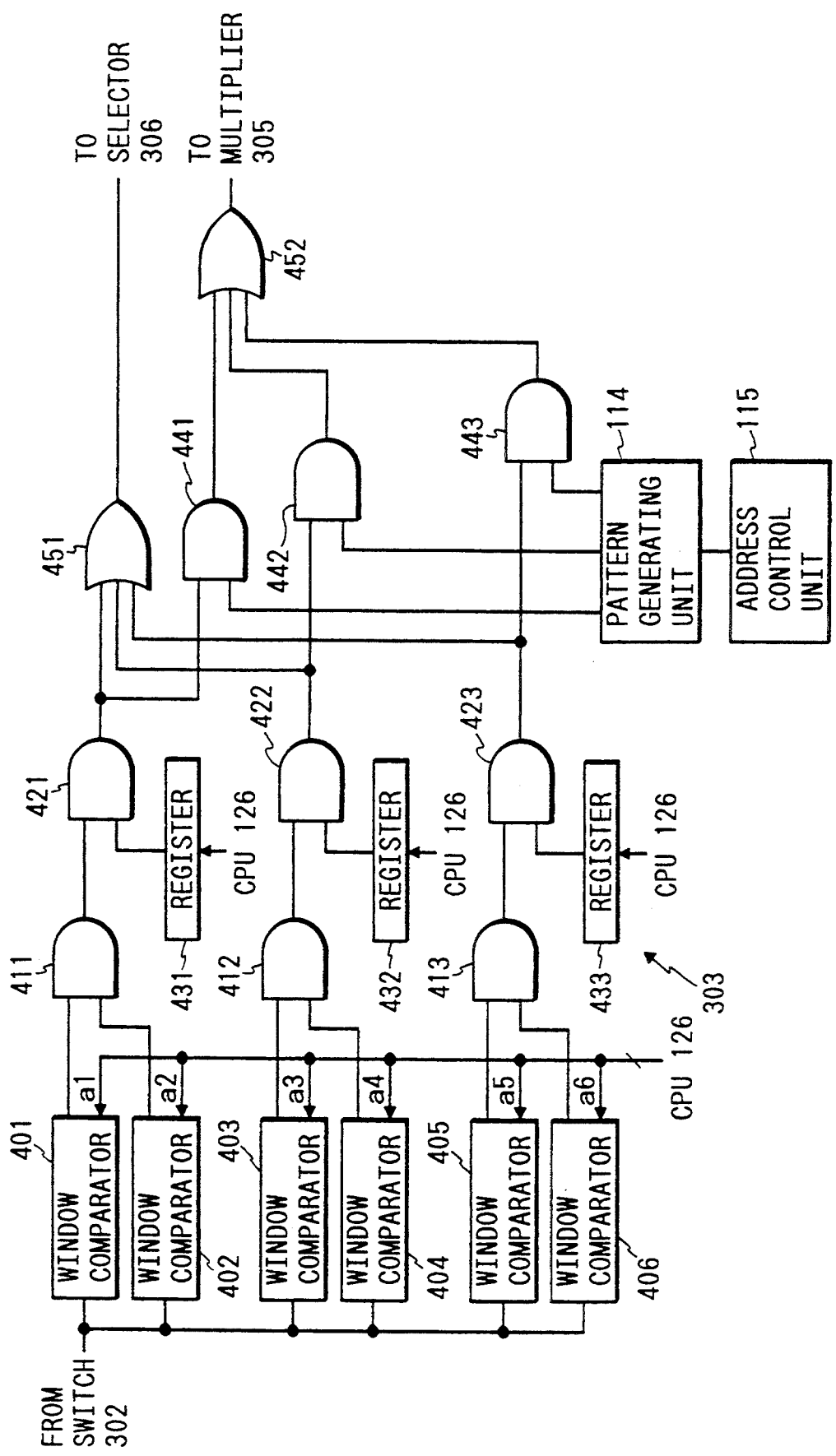
FIG. 15 is a block diagram of a pattern conversion unit 303.

When the pre-scan operation is performed in this manner to form a histogram and obtain threshold values, the original 100 is scanned again, and the switch 302 shown in FIG. 3 is switched such that an output from the color discriminating unit 301 is input to a pattern conversion unit 303 shown in detail in FIG. 15. Thereafter, the threshold values (a1 to a6 in FIG. 15) at the positions C, B, F, E, I, and H are respectively set in window comparators 401 to 406 in the order named by the CPU 126, as shown in FIG. 15. More specifically, the threshold values a1 and a2 in the largest area between the positions C and B, the threshold values a3 and a4 in the second largest area between the positions F and E, and the threshold values a5 and a6 in the third largest area between the positions I and H are respectively set in the pairs of the window comparators 401 and 402, 403 and 404, and 405 and 406.

The following data are set in registers 431 to 433 by the operator.

When a button P1 of the operation unit is depressed by the operator, the largest color area of the color areas of an original is output as, e.g., a red pattern, while the remaining color areas are output as black patterns. That is, according to the above-described histogram, the hue range between the positions C and B is copied in red, while the remaining hue ranges are copied in black.

When a button P2 is depressed, the second largest color area of the color areas of an original is output as a red pattern, while the remaining color areas are output as black patterns. In this case, according to the above histogram, the hue range between the positions F and E is copied in red, while the remaining hue ranges are copied in black. When a button P3 is depressed, the third largest area of the color areas of an original is output as a red pattern, while the remaining color areas are output as black patterns. In this case, according to the above histogram, the hue range between the positions I and H is copied in red, while the remaining hue ranges are copied in black.

Assume, in the following description, that the button P1 is depressed by the operator to set the mode in which the largest color area of the color areas of an original is copied in red, while the remaining color areas are copied in black.

In a two-color copy operation using black and red, a black toner image is transferred on a surface of a transfer sheet first by the black developing unit 13 in FIG. 1. The transfer sheet on which the black toner image is transferred is then conveyed to the intermediate tray 24, and a red toner image is transferred on the same surface of the transfer sheet by the red developing unit 12, thereby performing two-color recording of an image.

First the CPU 126 sets the registers 431 to 433 in the black developing mode, and subsequently sets them in the red developing mode.

More specifically, in the black developing mode, "0" is set in the register 431 by the CPU 126, while, "1" is set in the registers 432 and 433 by the CPU 126.

In the red developing mode, "1" is set in the register 431, while "0" is set in the registers 432 and 433. In a register 308 shown in FIG. 3, "0" is set in the black developing mode, and "1" is set in the red developing mode.

In the mode set by depressing the button P1, therefore, when the hue value of a hue signal, obtained from the hue detecting unit 123 when the original 100 is read by a second scan operation in the black developing mode, falls in the range of the threshold values between the positions C and B (a1 <hue value<a2), both outputs from the window comparators 401 and 402 are set at "1" , and an output signal from an AND 411 is set at "1". However, since "1" is not set in the register 431, an output from an AND gate 421 is set at "0".

Similarly, when the window comparators 403 and 404 detect hue values between the threshold values at the positions E and F, an output signal from an AND gate 412 is set at "1". Since "1" is set in the register 432, an output from an AND gate 422 is set at "1". When the window comparators 405 and 406 detect hue values between the threshold values between the positions H and I, an output from an AND gate 413 is set at "1". Since "1" is set in the register 433, an output from an AND gate 423 is set at "1".

When one of the outputs from the AND gates 422 and 423 is set at "1", an output signal from an OR gate 451 is set at "1". As a result, the selector 306 shown in FIG. 3 selects a pattern signal from a multiplier 305. Pattern data from a pattern generating unit 114 is ANDed with the output from the AND gate 422 or 423. The resultant data is output to the multiplier 305 shown in FIG. 3 through an OR gate 452, and the value obtained by multiplying the data by the brightness signal Dout is output to the input terminal A of the selector 306 and an input terminal B of a selector 307. In the black developing mode, since "0" is preset in the register 308 shown in FIG. 3, the selector 307 selects the output signal from the selector 306. Developing based on this signal is performed by the black developing unit 13 shown in FIG. 1.

In the red developing mode, since "1" is set in only the register 431, when a hue value satisfying a relation of a1<hue value<a2 with respect to the threshold values a1 and a2 set in the window comparators 401 and 402 is input, the AND gate 421 outputs "1", and the OR gate 451 also outputs "1". The output from the AND gate 421 is ANDed with the output from the pattern generating unit 114, and pattern data is output from the OR gate 452. This pattern data is multiplied by the brightness signal Dout, and the resultant data is input to the selector 307. In the red developing mode, since "1" is preset in the register 308, the selector 307 selects the output signal from the multiplier 305. As a result, developing based on this signal is performed by the red developing unit 12.

Figures 17A, 17B:
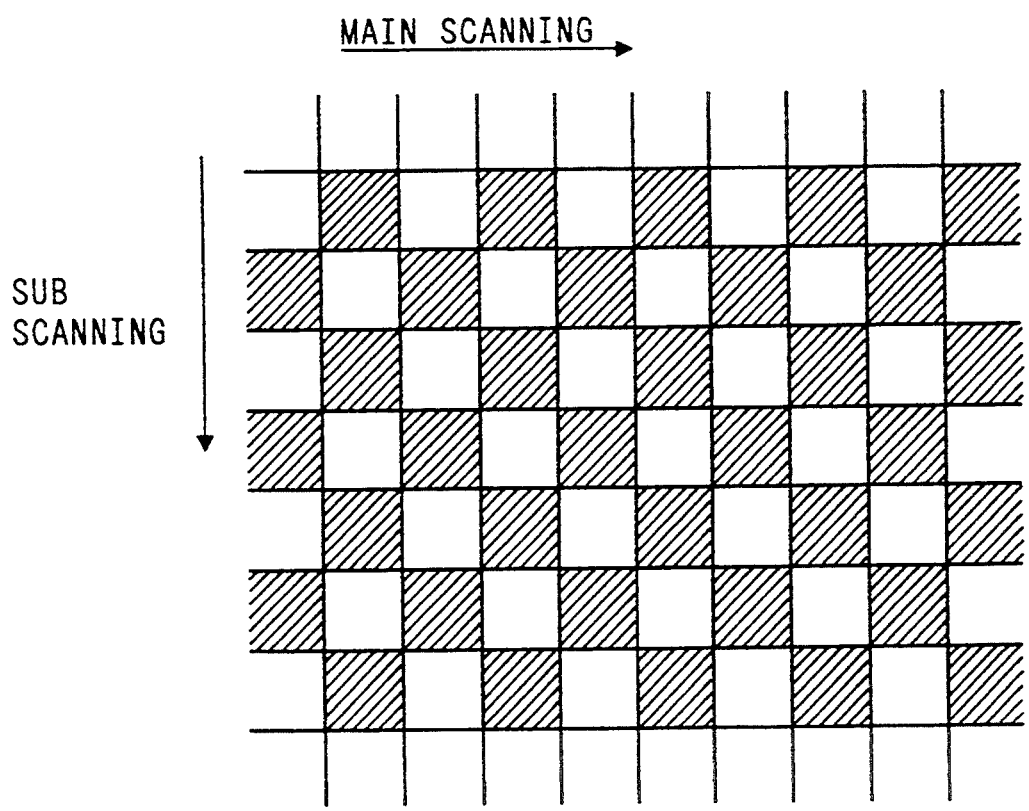
FIGS. 17A and 17B are views showing pattern data stored in a ROM 130.

FIG. 16 shows the detailed arrangement of the pattern generating unit 114 and an address control unit 115 in FIG. 15. The pattern generating unit 114 is constituted by a ROM 130 in which dot data for patterns are pre-stored at addresses constituted by high order addresses and low order addresses, as shown in FIGS. 17A and 17B. The address control unit 115 generates a read address of the ROM 130 to read out a pattern image corresponding to the colors of an original image.

Figure 18:
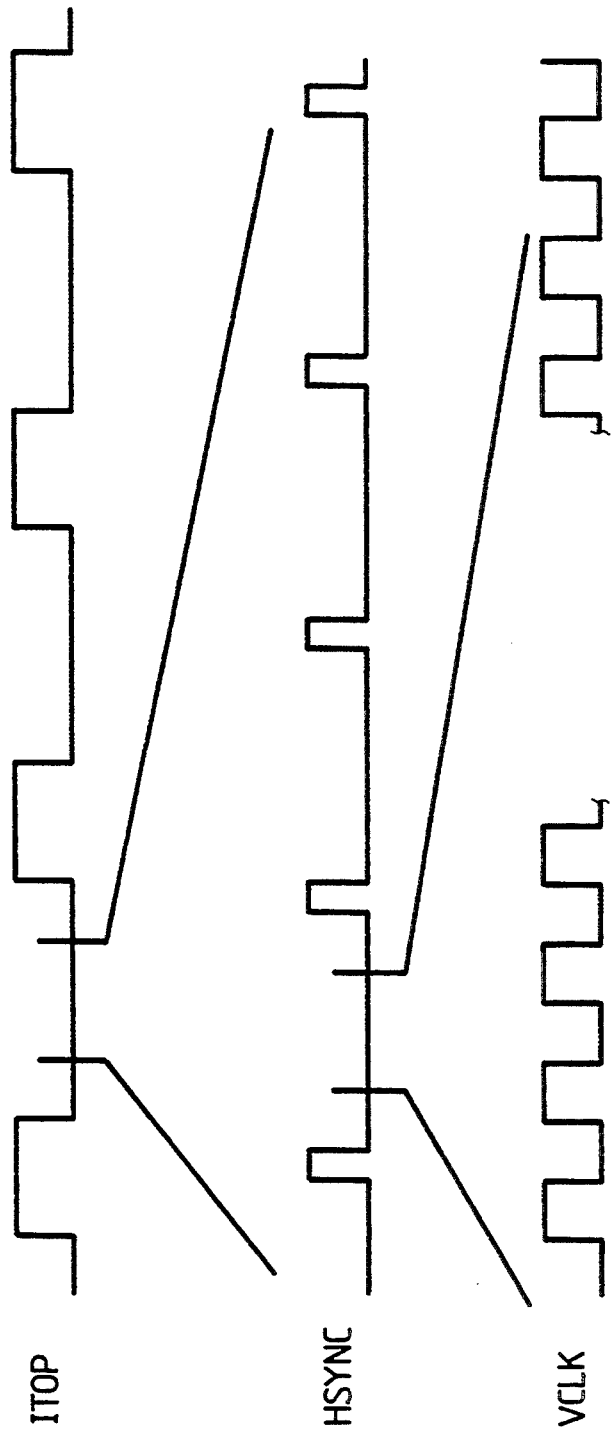
FIG. 18 is a timing chart of the address control unit 115.

A main scanning counter 131 of the address control unit 115 counts the pulses of a pixel count signal VCLK in synchronism with a horizontal sync signal HSYNC, and generates a high order address of the ROM 130, as shown in FIG. 18. A sub scanning counter 133 counts the pulses of the horizontal sync signal HSYNC in synchronism with a signal ITOP which is set at low 10 level while the image reading unit 101 shown in FIG. 2 reads the original 100, thus generating a low order address of the ROM 130.

Note that toners having other colors than black and red toners may be used for developing, and that three or more developing units may be used.

In addition, the present invention can be applied to an ink jet printer, a thermal printer, and the like as well as an electrophotographic recording apparatus. Furthermore, the present invention can be applied to a facsimile apparatus in addition to a copying machine.

As has been described above, according to the present invention, a histogram of color data is formed by a pre-scan operation, and patterns can be reproduced in different colors in accordance with the order of the sizes of color areas. Therefore, a color image can be reproduced by monochrome patterns, while a specific color area can be emphasized by reproducing it in a different color.

What is claimed is:

1. An image forming apparatus comprising:
   input means for inputting an image having a plurality of colors;
   discriminating means for discriminating each of the plurality of colors of the image input from said input means;
   pattern generating means for generating a pattern image corresponding to the colors discriminated by said discriminating means; and
   image forming means for forming the pattern image, generated by said pattern generating means on a recording medium, wherein said image forming means forms the pattern image in a color associated with the colors discriminated by said discriminating means.

2. An apparatus according to claim 1, wherein said image forming means forms a specific color area of the input image in a color different from a color used for remaining areas.

3. An apparatus according to claim 2, further comprising recognizing means for recognizing generation frequencies of colors discriminated by said discriminating means, wherein said image forming means determines the specific color on the basis of the generation frequencies of the colors recognized by said recognizing means.

4. An apparatus according to claim 1, wherein said input means is an image reader.

5. An apparatus according to claim 1, wherein said discriminating means calculates hue values of the input image, and discriminates colors on the basis of the hue values.

6. An image forming apparatus comprising:
   input means for inputting an image having a plurality of colors;
   recognizing means for recognizing each of the plurality of colors of the image input from said input means and proportions of each of the plurality of colors in the input image; and
   image forming means for forming the input image on a recording medium, wherein said image forming means forms the image in colors associated with the recognized colors and in accordance with the recognized proportions.

7. An apparatus according to claim 6, wherein said recognizing means recognizes the proportions of the colors by measuring generation frequencies of the colors.

8. An apparatus according to claim 6, further comprising input means for inputting data indicating the proportions of the colors, wherein said image forming means determines the colors of the input image formed in different colors on the basis of the data input from said input means.

9. An image processing apparatus comprising:
   color discriminating means for discriminating colors of an input image;
   pattern generating means for generating patterns in accordance with a discrimination result obtained by said color discriminating means;
   reproducing means for reproducing a selected color area in a color different from a color used for remaining color areas;
   histogram forming means for forming a histogram of control signals on the basis of image data of an original read by pre-scan operation; and
   threshold value detecting means for detecting threshold values of control signals in the histogram formed by said histogram forming means,
   wherein said reproducing means reproduces the selected color area in a pattern of a color different from a color used for the remaining color areas on the basis of the threshold values detected by said threshold value detecting means.

10. An apparatus according to claim 9, wherein the control signals are hue values.

11. An image forming apparatus comprising:
   input means for inputting an image having a plurality of colors;
   discriminating means for discriminating colors of the image input from said input means;
   converting means for converting the input image into a pattern image in accordance with a color discriminated by said discriminating means;
   image forming means for forming an image on a recording medium in a plurality of colors; and
   control means for controlling said image forming means so as to form the pattern image converted by said converting means in a color associated with the color discriminated by said discriminating means.

12. An image processing method comprising the steps of:
inputting an image having a plurality of colors;
discriminating each of the plurality of colors of the input image;
generating a pattern image corresponding to the discriminated color; and
forming the pattern image on a recording medium in a color associated with the discriminated colors.

13. An image forming apparatus comprising:
input means for inputting an image having a plurality of colors;
discriminating means for discriminating each of the plurality of colors of the image input from said input means;
pattern generating means for generating a pattern image corresponding to the colors discriminated by said discriminating means; and
image forming means for forming the pattern image, generated by said pattern generating means on a recording medium in a plurality of colors.

14. An image forming apparatus according to claim 13, wherein said image forming means forms a predetermined pattern image in a different color of other pattern image.

15. An image forming apparatus according to claim 13, wherein said image forming means comprises a plurality of image forming units forming the image in each color.

16. An image forming apparatus according to claim 13, wherein said image forming means forms the image in two colors of red and black.

17. An image forming apparatus according to claim 13, wherein said image forming means is an electrophotographic printer.

18. An image processing method comprising the steps of:
inputting an image having a plurality of colors;
discriminating each of the plurality of colors of the input image;
generating a pattern image corresponding to the discriminated color; and
forming the pattern image on a recording medium in a plurality of colors.

19. An image processing method according to claim 18, wherein said image forming step forms a predetermined pattern image in a different color of other pattern image.

20. An image processing method according to claim 18, wherein said image forming step forms the image in two colors of red and black.

21. An image processing method according to claim 18, wherein said forming step effects an electrophotographic recording.

* * * * *

UNITED STATES PATENT AND TRADEMARK OFFICE
CERTIFICATE OF CORRECTION

PATENT NO. : 5,444,556
DATED : August 22, 1995
INVENTOR(S) : Akio Ito, et al.

It is certified that error appears in the above-indentified patent and that said Letters Patent is hereby corrected as shown below:

COLUMN 5

Line 7, "to from" should read --from--; and
Line 18, "O $\leq$ i > 240" should read --O $\leq$ i < 240--.

COLUMN 11

Line 25, "other" should read --another--.

COLUMN 12

Line 20, "other" should read --another--.

Signed and Sealed this

Twenty-first Day of November, 1995

Attest:

BRUCE LEHMAN

Attesting Officer          Commissioner of Patents and Trademarks